US012584598B2

(12) United States Patent
Zeng

(10) Patent No.: US 12,584,598 B2
(45) Date of Patent: Mar. 24, 2026

(54) LIGHT-EMITTING ELEMENT AND LIGHT SOURCE MODULE

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

(*) Notice: Subject to any disclaimer, the term of this patent is extended or adjusted under 35 U.S.C. 154(b) by 0 days.

(21) Appl. No.: 19/267,994

(22) Filed: Jul. 14, 2025

(65) Prior Publication Data

US 2025/0341292 A1 Nov. 6, 2025

Related U.S. Application Data

(63) Continuation of application No. PCT/CN2024/116810, filed on Sep. 4, 2024.

(30) Foreign Application Priority Data

Sep. 26, 2023 (CN) ......................... 202311267233.3
Sep. 26, 2023 (CN) ......................... 202322631274.8

(51) Int. Cl.
*F21K 9/62* (2016.01)
*F21V 29/67* (2015.01)
(Continued)

(52) U.S. Cl.
CPC .............. *F21K 9/62* (2016.08); *F21V 29/673* (2015.01); *F21V 29/713* (2015.01); *F21V 29/76* (2015.01);
(Continued)

(58) Field of Classification Search
CPC ........ F21K 9/62; F21V 29/673; F21V 29/713; F21V 29/76; F21V 29/83
See application file for complete search history.

(56) References Cited

U.S. PATENT DOCUMENTS 10,163,747 B2 * 12/2018 Heng .................. H01L 23/3128
11,083,059 B2 * 8/2021 Francis ................ H10H 29/142
(Continued)

FOREIGN PATENT DOCUMENTS

CN 105324845 2/2016
CN 110617407 12/2019
(Continued)

OTHER PUBLICATIONS

CNIPA, First Office Action for CN Application No. 202311267233.3, Sep. 24, 2025.
(Continued)

*Primary Examiner* — Bryon T Gyllstrom
(74) *Attorney, Agent, or Firm* — Hodgson Russ LLP

(57) ABSTRACT

Alight source module comprises the light-emitting element, a heat radiator and a diffusion lens. The light-emitting element comprises a substrate and a chip module arranged on the substrate. RGB light mixing units and cold and warm light mixing units of the light-emitting element are concentrically arranged, a plurality of RGB light mixing units and a plurality of cold and warm light mixing units are alternately arranged at intervals, and the plurality of RGB light mixing units and the plurality of cold and warm light mixing units are rotationally symmetrical about the center of the chip module.

20 Claims, 4 Drawing Sheets

(51) Int. Cl.

| | |
|---|---|
| ***F21V 29/71*** | (2015.01) |
| ***F21V 29/76*** | (2015.01) |
| ***F21V 29/83*** | (2015.01) |
| ***F21Y 105/18*** | (2016.01) |
| ***F21Y 113/17*** | (2016.01) |
| ***F21Y 115/10*** | (2016.01) |

(52) U.S. Cl.
CPC ........... *F21V 29/83* (2015.01); *F21Y 2105/18* (2016.08); *F21Y 2113/17* (2016.08); *F21Y 2115/10* (2016.08)

(56) References Cited

U.S. PATENT DOCUMENTS

| | | | | |
|---|---|---|---|---|
| 11,830,858 | B2 * | 11/2023 | Wang | H01L 25/0753 |
| 2013/0106276 | A1 * | 5/2013 | Miyairi | H01L 25/0753 313/498 |
| 2017/0047488 | A1 * | 2/2017 | Kaneko | H10H 20/8513 |
| 2019/0148590 | A1 * | 5/2019 | Watanabe | G02F 1/133603 257/79 |
| 2019/0371768 | A1 * | 12/2019 | You | H05B 45/20 |
| 2021/0098433 | A1 | 4/2021 | Alfier et al. | |

FOREIGN PATENT DOCUMENTS

| | | |
|---|---|---|
| CN | 210129080 | 3/2020 |
| CN | 217360514 | 9/2022 |
| CN | 217361580 | 9/2022 |
| CN | 217387153 | 9/2022 |
| CN | 218783036 | 3/2023 |
| CN | 218972500 | 5/2023 |
| CN | 117249401 | 12/2023 |
| CN | 220749864 | 4/2024 |
| KR | 102275357 | 7/2021 |

OTHER PUBLICATIONS

WIPO, International Search Report for PCT/CN2024/116810, Nov. 11, 2024.

* cited by examiner

LIGHT-EMITTING ELEMENT AND LIGHT SOURCE MODULE

CROSS-REFERENCE TO RELATED APPLICATIONS

The present application is a continuation of International Application No. PCT/CN2024/116810, filed on Sep. 4, 2024, which claims priority to Chinese Patent Application No. 202311267233.3, filed on Sep. 26, 2023, and Chinese Patent Application No. 202322631274.8, filed on Sep. 26, 2023. The entire disclosures of the above-identified applications are hereby incorporated herein by reference.

TECHNICAL FIELD

The present application relates to the technical field of light-emitting devices, and particularly to a light-emitting element and a light source module.

BACKGROUND

With the development of Light-Emitting Diode (LED) lighting technology, LED light sources have become a representative of energy conservation and environmental protection, with characteristics a soft light emission, eye-friendly properties, power saving, and natural light.

In existing multi-color LED lights, there are usually more than three LED beads of different colors. The light emitted by each LED bead is mixed through a light-mixing component to synthesize the required color. To achieve the effect of uniform light-mixing, a light-mixing cavity is currently commonly used. However, the light-mixing cavity has a hollow structure, which requires a certain spatial distance in display products, leading to excessively large product sizes. In addition, to ensure the light-mixing effect, the light-mixing cavity needs to maintain a certain length. As a result, light in the cavity may experience compressed reflection angles, causing a display phenomenon where the edges are dark and the center is bright, which affects the display effect and user experience.

SUMMARY

There are provided a light-emitting element and a light source module according to embodiments of the present application. The technical solution is as below:

According to a first aspect of embodiments of the present application, there is provided a light-emitting element, which includes a substrate and a chip module provided on the substrate, the chip module includes a warm light chip, a cool light chip, and a Red-Green-Blue (RGB) chip set, and the RGB chip set comprises a red light chip, a green light chip, and a blue light chip;

a plurality of RGB chip sets are provided at intervals and enclosed to form an annular RGB light-mixing unit; the warm light chip and the cool light chip are adjacently provided to form a warm-cool chip set, and a plurality of the warm-cool chip sets are provided at intervals and enclosed to form an annular warm-cool light-mixing unit; and wherein the substrate is provided with at least two RGB light-mixing units and at least two warm-cool light-mixing units, the RGB light-mixing unit and the warm-cool light-mixing unit are concentrically provided; and a plurality of RGB light-mixing units and a plurality of warm-cool light-mixing units are spaced and staggered, such that each RGB light-mixing unit and each warm-cool light-mixing unit are rotationally symmetrical about a center of the chip module.

According to a second aspect of embodiments of the present application, there is provided a light source module, which includes the light-emitting element as mentioned above, wherein the light source module further comprises a heat sink and a diffusion lens; the substrate of the light-emitting element is fixed on a top of the heat sink, the diffusion lens is provided on a side of the substrate away from the heat sink, and the chip module faces the diffusion lens.

DETAILED DESCRIPTION OF THE EMBODIMENTS

Figure 1:
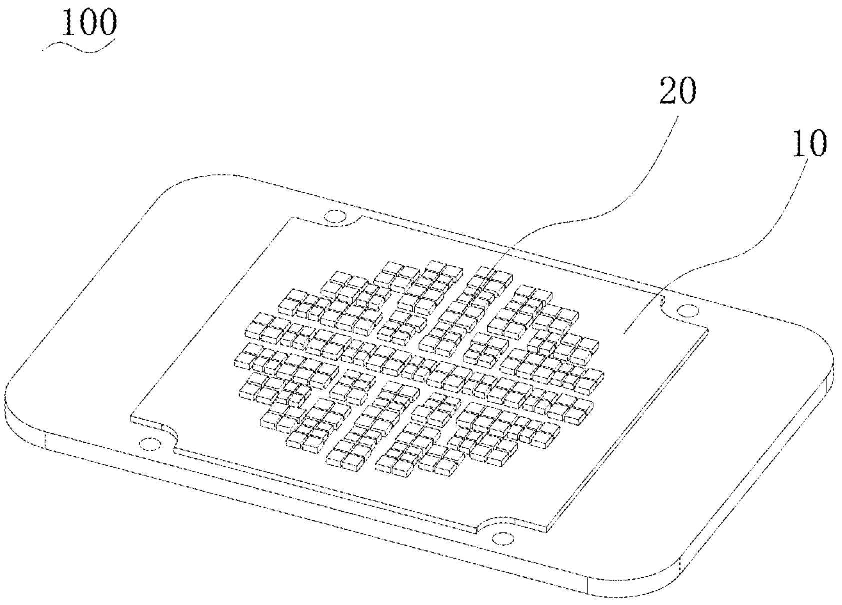
FIG. 1 is a structural schematic view of an embodiment of the light-emitting element of the present application.

A typical embodiment demonstrating the features and advantages of the present application will be described in detail below. It should be understood that the present application is capable of various changes in different embodiments, all without departing from the scope of the present application, and the descriptions and drawings herein are essentially for illustrative purposes rather than to limit the present application.

In the description of the present application, it should be understood that in the embodiments shown in the drawings, indications of directions or positional relationships (such as up, down, left, right, front, and rear, etc.) are only for the convenience of describing the present application and simplifying the description, rather than indicating or implying that the referred device or element must have a specific orientation, be constructed, and operate in a specific orientation. When these elements are in the positions shown in the drawings, these descriptions are appropriate. If the description of the positions of these elements changes, the indications of these directions shall also change accordingly.

Furthermore, the terms "first" and "second" are only used for descriptive purposes and cannot be interpreted as indicating or implying relative importance or implicitly specifying the quantity of the indicated technical features. Thus, a feature defined with "first" or "second" may explicitly or implicitly include one or more of such features. In the description of this application, "a plurality of" means two or more, unless specifically and clearly defined otherwise.

Figure 2:
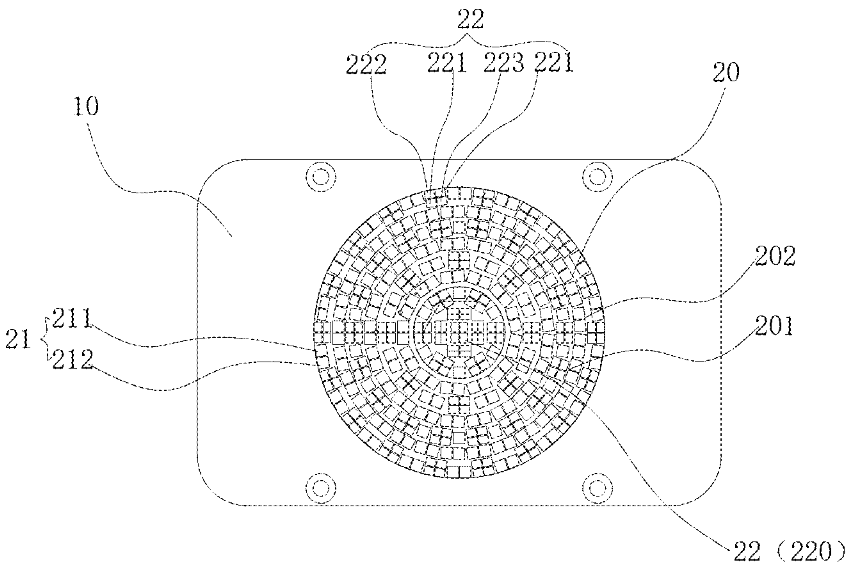
FIG. 2 is a structural schematic view of the light-emitting element shown in FIG. 1.
Figure 3:
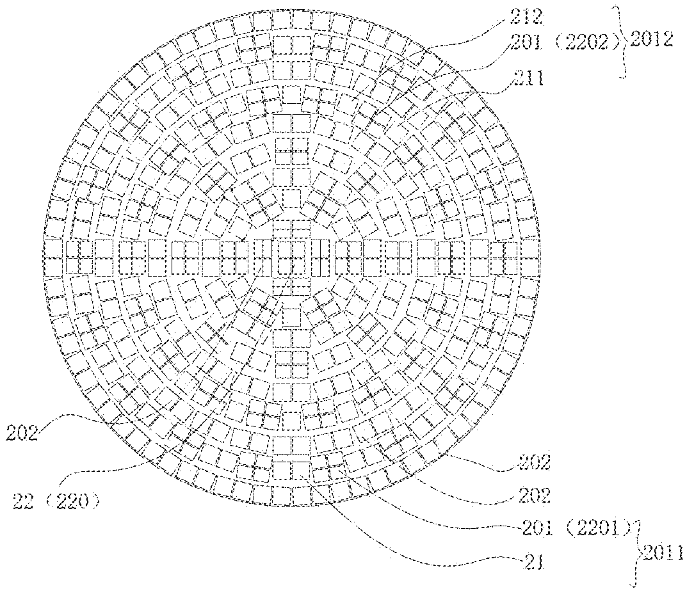
FIG. 3 is a structural schematic view of the chip module in the light-emitting element shown in FIG. 1.

With reference to FIGS. 1 to 3, an embodiment of the present application provides a light-emitting element 100.

Since different light-emitting chips are arranged and packaged in a certain manner and arrangement density to form light-mixing units, different light-emitting chips can perform light mixing, thereby eliminating a light-mixing cavity, simplifying the structure of the light-emitting module, reducing light loss, improving light efficiency, and ensuring user experience.

Specifically, the light-emitting element 100 of this embodiment includes a substrate 10 and a chip module 20 provided on the substrate 10. The chip module 20 includes a warm light chip 211, a cool light chip 212, and a Red-Green-Blue (RGB) chip set 22. The RGB chip set 22 includes a red light chip 221, a green light chip 222, and a blue light chip 223.

A plurality of RGB chip sets are provided at intervals and enclosed to form an annular RGB light-mixing unit 201. The warm light chip 211 and the cool light chip 212 are adjacently provided to form a warm-cool chip set 21, and a plurality of warm-cool chip sets 21 are provided at intervals and enclosed to form an annular warm-cool light-mixing unit 202.

The substrate 10 is provided with at least two RGB light-mixing units 201 and at least two warm-cool light-mixing units 202. The RGB light-mixing units 201 and warm-cool light-mixing units 202 are concentrically provided, and the plurality of RGB light-mixing units 201 and the plurality of warm-cool light-mixing units 202 are spaced and staggered, such that the plurality of RGB light-mixing units 201 and the plurality of warm-cool light-mixing units 202 are rotationally symmetrical about the center of the chip module 20.

In the light-emitting element 100, the RGB light-mixing units 201 and the warm-cool light-mixing units 202 are concentrically provided, and the plurality of RGB light-mixing units 201 and warm-cool light-mixing units 202 are spaced and staggered, such that the plurality of RGB light-mixing units 201 and the plurality of warm-cool light-mixing units 202 are rotationally symmetrical about the center of the chip module 20, such that each RGB chip set 22 can mix light with its circumferential warm light chip 211 and cool light chip 212, to make light mixing between different light-emitting chips. Thus, the light-mixing cavity in the light source module 1000 can be eliminated, simplifying the structure of the light source module 1000, reducing light loss, improving light efficiency, and ensuring user experience.

In this embodiment, the chip module 20 as a whole is a circular structure, and one RGB chip set 22 is provided at the center of the chip module 20.

Each RGB chip set 22 in this embodiment includes two red light chips 221, one green light chip 222, and one blue light chip 223. The two red light chips 221, one green light chip 222, and one blue light chip 223 are provided at intervals and enclosed to form a square structure. The two red light chips 221 are oppositely provided, and the green light chip 222 and the blue light chip 223 are oppositely provided.

One RGB chip set 22 is taken as a center of the chip module 20, that is, the center of this RGB chip set 22 is the center of the chip module 20.

Figure 4:
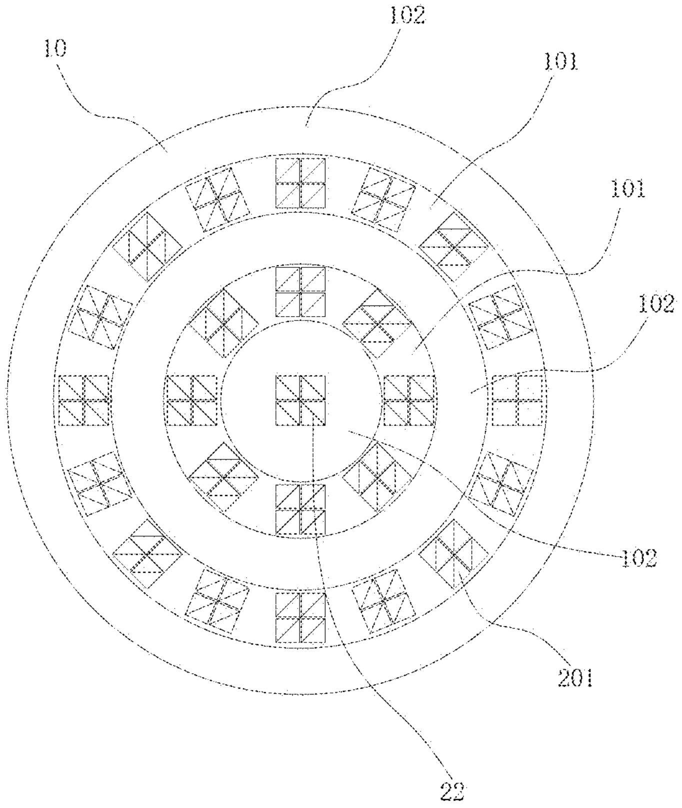
FIG. 4 is a structural schematic view of the arrangement of RGB light-mixing units on the substrate in the light-emitting element shown in FIG. 1.
Figure 5:
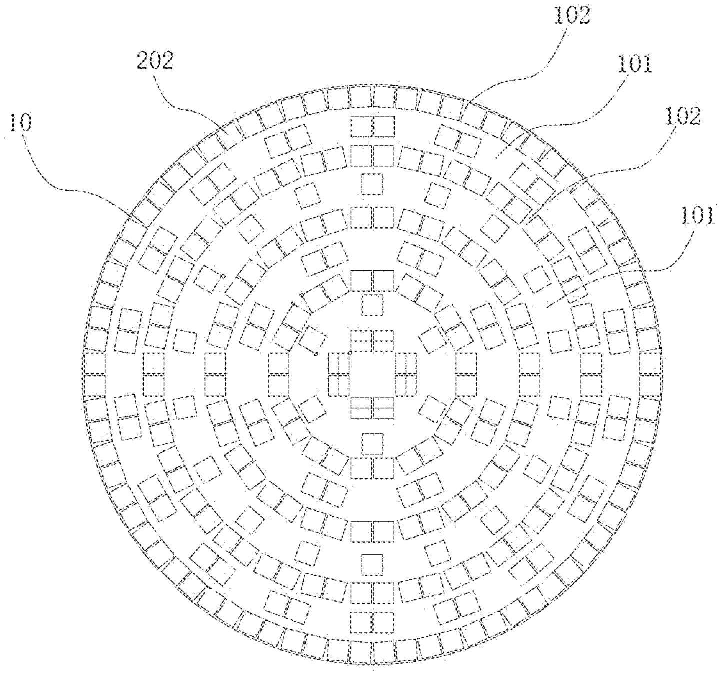
FIG. 5 is a structural schematic view of the arrangement of warm-cool light-mixing units on the substrate in the light-emitting element shown in FIG. 1.

Specifically, with reference to FIGS. 4 and 5, in practical settings, a central point can be determined on the substrate 10, and a plurality of concentric annular regions are provided and gradually diffuse outward on the surface of the substrate 10 with the central point as a center of a circle. The plurality of annular regions are respectively a plurality of first annular regions 101 and second annular regions 102, and the plurality of first annular regions 101 and the plurality of second annular regions 102 are alternately provided in sequence.

One RGB chip set 22 is provided at the central point of the substrate 10, and RGB light-mixing units 201 and warm-cool light-mixing units 202 are respectively provided in the plurality of annular regions, such that the plurality of RGB light-mixing units 201 and the plurality of warm-cool light-mixing units 202 are alternately provided in sequence, thereby achieving rotational symmetry of the plurality of RGB light-mixing units 201 and the plurality of warm-cool light-mixing units 202 about the center of the chip module 20.

In this embodiment, RGB light-mixing units 201 are provided at intervals in the first annular regions 101, and warm-cool light-mixing units 202 are provided in the second annular regions 102, such that the plurality of RGB light-mixing units 201 and the plurality of warm-cool light-mixing units 202 are sequentially and alternately provided, and the plurality of RGB light-mixing units 201 and the plurality of warm-cool light-mixing units 202 are rotationally symmetrical about the central point of the substrate 10.

Further, a plurality of RGB chip sets are provided at intervals and enclosed to form an annular RGB light-mixing unit 201. An outer contour of the RGB light-mixing unit 201 in this embodiment is circular. The warm light chip 211 and the cool light chip 212 are adjacently provided to form a warm-cool chip set 21, and a plurality of warm-cool chip sets 21 are provided at intervals and enclosed to form an annular warm-cool light-mixing unit 202. An outer contour of the warm-cool light-mixing unit 202 in this embodiment is square or circular.

The substrate 10 is provided with a plurality of RGB light-mixing units 201 and warm-cool light-mixing units 202. The RGB light-mixing units 201 and warm-cool light-mixing units 202 are concentrically provided, and the plurality of RGB light-mixing units 201 and the plurality of warm-cool light-mixing units 202 are spaced and staggered, such that the plurality of RGB light-mixing units 201 and the plurality of warm-cool light-mixing units 202 are rotationally symmetrical about the center of the chip module 20.

Specifically, the RGB chip set 22 provided at the center of the chip module 20 is a central chip set 220, and a set of square warm-cool light-mixing units 202 is provided at intervals around the central chip set 220. This arrangement enables the two red light chips 221, one green light chip 222, and one blue light chip 223 in the RGB chip set of the central chip set 220 to all mix light with the warm light chips 211 and the cool white chips in the circumferential direction, achieving the light-mixing effect between chips.

In this embodiment, around the square warm-cool light-mixing unit 202, a plurality of circular RGB light-mixing units 201 and a plurality of circular warm-cool light-mixing units 202 are concentrically provided and spaced apart, and the centers of the plurality of circular RGB light-mixing units 201 and the plurality of circular warm-cool light-mixing units 202 are the center of the RGB chip set of the central chip set 220.

When the plurality of circular RGB light-mixing units 201 and the plurality of circular warm-cool light-mixing units 202 are concentrically provided and spaced apart, the RGB light-mixing units 201 and warm-cool light-mixing units 202 are staggered, such that the plurality of RGB light-mixing units 201 and the plurality of warm-cool light-mixing units 202 on the substrate 10 are rotationally symmetrical about the center of the chip module 20.

In this embodiment, the RGB light-mixing units 201 and warm-cool light-mixing units 202 on the substrate 10 are concentrically provided, and the plurality of RGB light-mixing units 201 and the plurality of warm-cool light-mixing units 202 are spaced and staggered, such that the plurality of RGB light-mixing units 201 and the plurality of warm-cool light-mixing units 202 are rotationally symmetrical about the center of the chip module 20. This arrangement enables each multicolor chip to mix light with the warm light chips 211 and the cool white chips in its circumferential direction, to achieve the light-mixing effect of the light-emitting device, thereby eliminating a light-mixing cavity and simplifying the structure of the light-emitting device.

Further, in conjunction with FIG. 3, in the substrate 10 of this embodiment, all RGB light-mixing units 201 include a plurality of first light-mixing units 2201 and a plurality of second light-mixing units 2202 independently provided. Both the first light-mixing units 2201 and the second light-mixing units 2202 include a plurality of RGB chip sets provided at intervals and enclosed to form a circumferentially closed loop.

In this embodiment, the diameters of the plurality of first light-mixing units 2201 and the plurality of second light-mixing units 2202 are all different, that is, all RGB light-mixing units 201 on the substrate 10 include a plurality of first light-mixing units 2201 with different diameters and a plurality of second light-mixing units 2202 with different diameters.

In each first light-mixing unit 2201 of this embodiment, one warm-cool chip set 21 is provided between two adjacent RGB chip sets, such that one first light-mixing unit 2201 and the plurality of warm-cool chip sets 21 form a first light-mixing sub-module 2011. In each second light-mixing unit 2202, a warm light chip 211 or a cool light chip 212 is provided between two adjacent RGB chip sets, and the warm light chip 211 and cool light chip 212 are alternately provided, such that one second light-mixing unit 2202 and the plurality of cool light chips 212 and warm light chips 211 form a second light-mixing sub-module 2012.

In this embodiment, the outer contours of both the first light-mixing sub-module 2011 and the second light-mixing sub-module 2012 on the substrate 10 are circular, and the first light-mixing sub-modules 2011 and the second light-mixing sub-modules 2012 are concentrically provided. The plurality of first light-mixing sub-modules 2011 and the plurality of second light-mixing sub-modules 2012 are provided at intervals, and the first light-mixing sub-module 2011 and the second light-mixing sub-module 2012 are staggered, one warm-cool light-mixing unit 202 is provided between the first light-mixing sub-module 2011 and the second light-mixing sub-module 2012.

This arrangement enables the RGB chip sets 22 in each RGB light-mixing unit 201 to mix light not only with the warm-cool chip sets 21 in the circumferential warm-cool light-mixing units 202 but also with the warm-cool chip sets 21, warm light chips 211, or cool light chips 212 on both sides, further enhancing the light-mixing effect, improving light efficiency performance, and ensuring user experience.

Figure 6:
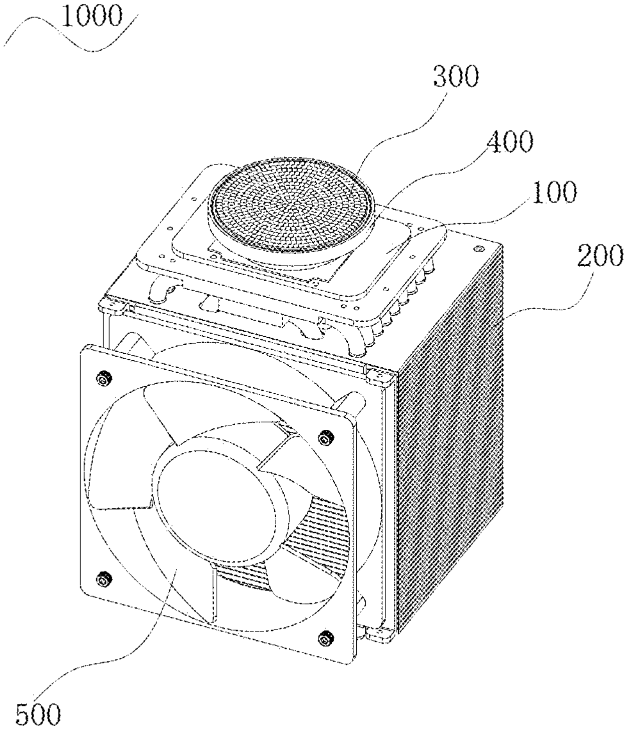
FIG. 6 is a structural schematic view of the light source module of an embodiment of the present application.
Figure 7:
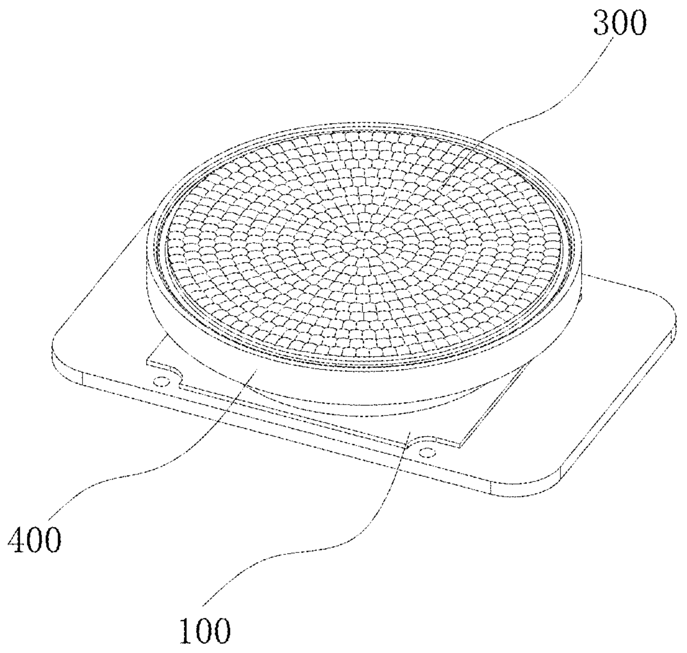
FIG. 7 is an overall structural view of the light-emitting element, support frame, and diffusion lens in the light source module shown in FIG. 6.
Figure 8:
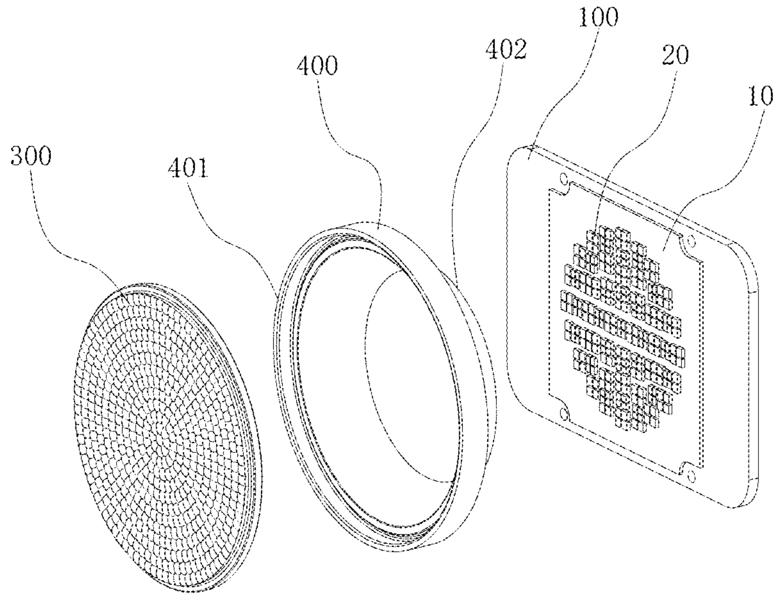
FIG. 8 is an exploded view of FIG. 7.

With reference to FIGS. 6 to 8, an embodiment of the present application further provides a light source module 1000, including the above-mentioned light-emitting element 100. The specific structure of the light-emitting element 100 is described above and will not be repeated here.

In this embodiment, the light source module 1000 further includes a heat sink 200 and a diffusion lens 300. The substrate 10 of the light-emitting element 100 is fixed on a top of the heat sink 200, the diffusion lens 300 is provided on a side of the substrate 10 away from the heat sink 200, and the chip module 20 faces the diffusion lens 300.

The light source module 1000 of this embodiment further includes a support frame 400. The support frame 400 is open at both ends and hollow inside. The two open ends of the support frame 400 are respectively a large opening end 401 and a small opening end 402. The small opening end 402 of the support frame 400 is fixed on the surface of the substrate 10, such that the chip module 20 is correspondingly provided inside the support frame 400, and the diffusion lens 300 is fixed on the large opening end 401 of the support frame 400.

For the light source module 1000 of this embodiment, the warm light chips 211, cool light chips 212, red light chips 221, green light chips 222, and blue light chips 223 in the light-emitting element 100 are provided and packaged on the substrate 10 in a certain manner and arrangement density to form light-mixing units, such that different light-emitting chips can mix light, thereby eliminating a light-mixing cavity in the light source module 1000, simplifying the structure of the light source module 1000, reducing light loss, improving light efficiency, and ensuring user experience.

In addition, the light source module 1000 further includes a cooling fan 500 fixed on a side surface of the heat sink 200. The heat sink 200 of this embodiment can be composed of a plurality of metal heat dissipation fins, which are sequentially provided at intervals. The cooling fan is fixed on the side surface of the heat sink 200, and the air generated by the cooling fan 500 can pass through the gaps between the metal heat dissipation fins to improve the overall heat dissipation effect of the light source module 1000. And due to the light-mixing effect of the light-emitting element 100, the light-mixing cavity can be eliminated in the light source module 1000, and thus the heat dissipation structure for dissipating heat from the light-mixing cavity can be eliminated, further simplifying the overall structure of the light source module 1000.

For the light-emitting element and the light source module of this embodiment, the RGB light-mixing units and the warm-cool light-mixing units in the light-emitting element are concentrically provided, and the plurality of RGB light-mixing units and the plurality of warm-cool light-mixing units are spaced and staggered, such that the plurality of RGB light-mixing units and the plurality of warm-cool light-mixing units are rotationally symmetrical about the center of the chip module, such that all RGB chip sets, warm light chips, and cool light chips can be more uniformly distributed on the substrate, enabling sufficient mixing of different light colors to have a good light-mixing effect. Therefore, the light source module does not need to additionally adopt a light-mixing cavity structure to meet the light-mixing effect, thereby simplifying the structure of the light source module, reducing light loss caused by multiple reflections of the light-mixing cavity, improving light efficiency, and ensuring user experience.

Although the present application has been described with reference to several typical embodiments, it should be understood that the terms used are illustrative and exemplary rather than restrictive. Since the present application can be embodied in many forms without departing from the spirit or essence of the invention, it should be understood that the above embodiments are not limited to any of the foregoing details, but should be broadly construed within the spirit and scope defined by the appending claims. Therefore, all changes and modifications falling within the scope of the claims or their equivalents should be covered by the appending claims.

What is claimed is:

1. A light-emitting element, comprising a substrate and a chip module provided on the substrate, wherein the chip module comprises a warm light chip, a cool light chip, and a Red-Green-Blue (RGB) chip set, and the RGB chip set comprises a red light chip, a green light chip, and a blue light chip;

a plurality of RGB chip sets are provided at intervals and enclosed to form an annular RGB light-mixing unit; the warm light chip and the cool light chip are adjacently provided to form a warm-cool chip set, and a plurality of warm-cool chip sets are provided at intervals and enclosed to form an annular warm-cool light-mixing unit; and wherein the substrate is provided with at least two RGB light-mixing units and at least two warm-cool light-mixing units, each RGB light-mixing unit and each warm-cool light-mixing unit are concentrically provided; and a plurality of RGB light-mixing units and a plurality of warm-cool light-mixing units are spaced and staggered, such that each RGB light-mixing unit and each warm-cool light-mixing unit are rotationally symmetrical about a center of the chip module.

2. The light-emitting element according to claim 1, wherein an outer contour of the chip module is circular, and one RGB chip set is provided at a center of a circle of the chip module.

3. The light-emitting element according to claim 1, wherein an outer contour of each RGB light-mixing unit is circular.

4. The light-emitting element according to claim 1, wherein an outer contour of each warm-cool light-mixing unit is square or circular.

5. The light-emitting element according to claim 1, wherein the plurality of RGB light-mixing units on the substrate comprise a plurality of first light-mixing units and a plurality of second light-mixing units independently provided, each of the plurality of first light-mixing units and the plurality of second light-mixing units comprises the plurality of RGB chip sets provided at intervals and enclosed to form a circumferentially closed loop.

6. The light-emitting element according to claim 5, wherein one warm-cool chip set is provided between two adjacent RGB chip sets in each first light-mixing unit, such that each first light-mixing unit and the plurality of warm-cool chip sets form a first light-mixing sub-module; and one warm light chip or one cool light chip is provided between two adjacent RGB chip sets in each second light-mixing unit, a plurality of warm light chips and a plurality of cool light chips are alternately provided, such that each second light-mixing unit and the plurality of cool light chips and the plurality of warm light chips form a second light-mixing sub-module.

7. The light-emitting element according to claim 6, wherein the first light-mixing sub-module and the second light-mixing sub-module are concentrically provided, and a plurality of first light-mixing sub-modules and a plurality of second light-mixing sub-modules are spaced and staggered.

8. The light-emitting element according to claim 7, wherein a set of warm-cool light-mixing units is provided between the first light-mixing sub-module and the second light-mixing sub-module.

9. The light-emitting element according to claim 7, wherein the plurality of RGB light-mixing units on the substrate comprise a plurality of first light-mixing units with different diameters and a plurality of second light-mixing units with different diameters.

10. The light-emitting element according to claim 1, wherein each RGB chip set comprises two red light chips, one green light chip, and one blue light chip, the two red light chips are oppositely provided, and the green light chip and the blue light chip are oppositely provided.

11. The light-emitting element according to claim 1, wherein with a center point of a surface of the substrate as a center of a circle, the surface of the substrate is provided with a plurality of concentric annular regions gradually diffusing outward from the center; the plurality of concentric annular regions are respectively a plurality of first annular regions and a plurality of second annular regions, and the plurality of first annular regions and the plurality of second annular regions are alternately provided.

12. The light-emitting element according to claim 11, wherein one RGB chip set is provided at the center of the circle, the plurality of RGB light-mixing units are provided in the plurality of first annular regions, and the plurality of warm-cool light-mixing units are provided in the plurality of second annular regions, such that the plurality of RGB light-mixing units and the plurality of warm-cool light-mixing units are alternately provided, and the plurality of RGB light-mixing units and the plurality of warm-cool light-mixing units are rotationally symmetrical about the center of the circle.

13. Alight source module, comprising a light-emitting element, a heat sink and a diffusion lens, wherein light-emitting element comprises a substrate and a chip module provided on the substrate, wherein the chip module comprises a warm light chip, a cool light chip, and a Red-Green-Blue (RGB) chip set, and the RGB chip set comprises a red light chip, a green light chip, and a blue light chip;

a plurality of RGB chip sets are provided at intervals and enclosed to form an annular RGB light-mixing unit; the warm light chip and the cool light chip are adjacently provided to form a warm-cool chip set, and a plurality of warm-cool chip sets are provided at intervals and enclosed to form an annular warm-cool light-mixing unit; and wherein the substrate is provided with at least two RGB light-mixing units and at least two warm-cool light-mixing units, each RGB light-mixing unit and each warm-cool light-mixing unit are concentrically provided; and a plurality of RGB light-mixing units and a plurality of warm-cool light-mixing units are spaced and staggered, such that each RGB light-mixing unit and each warm-cool light-mixing unit are rotationally symmetrical about a center of the chip module;

wherein the substrate of the light-emitting element is fixed on a top of the heat sink, the diffusion lens is provided on a side of the substrate away from the heat sink, and the chip module faces the diffusion lens.

14. The light source module according to claim 13, wherein the light source module further comprises a support frame, the support frame is open at two ends and hollow inside, and the two open ends of the support frame are a large opening end and a small opening end; the small opening end is fixed on a surface of the substrate, such that the chip module is correspondingly provided inside the support frame, and the diffusion lens is fixed on the large opening end of the support frame.

15. The light source module according to claim 14, wherein the light source module further comprises a cooling fan, and the cooling fan is fixed on a side surface of the heat sink.

16. The light source module according to claim 13, wherein an outer contour of the chip module is circular, and one RGB chip set is provided at a center of a circle of the chip module.

17. The light source module according to claim 13, wherein an outer contour of each RGB light-mixing unit is circular.

18. The light source module according to claim 13, wherein an outer contour of each warm-cool light-mixing unit is square or circular.

19. The light source module according to claim 13, wherein the plurality of RGB light-mixing units on the substrate comprise a plurality of first light-mixing units and a plurality of second light-mixing units independently provided, each of the plurality of first light-mixing units and the plurality of second light-mixing units comprises the plurality of RGB chip sets provided at intervals and enclosed to form a circumferentially closed loop.

20. The light source module according to claim 19, wherein one warm-cool chip set is provided between two adjacent RGB chip sets in each first light-mixing unit, such that each first light-mixing unit and the plurality of warm-cool chip sets form a first light-mixing sub-module; and one warm light chip or one cool light chip is provided between two adjacent RGB chip sets in each second light-mixing unit, a plurality of warm light chips and a plurality of cool light chips are alternately provided, such that each second light-mixing unit and the plurality of cool light chips and the plurality of warm light chips form a second light-mixing sub-module.

* * * * *